(12) United States Patent
Schilit et al.

(10) Patent No.: US 8,626,135 B1
(45) Date of Patent: Jan. 7, 2014

(54) COMMUNICATION REDIRECT VIA SHORT-RANGE COMMUNICATION FOR DIGITAL ITEM RETRIEVAL

(71) Applicants: William Noah Schilit, Mountain View, CA (US); Roy Want, Los Altos, CA (US); Robert Douglas Fritz, III, San Francisco, CA (US)

(72) Inventors: William Noah Schilit, Mountain View, CA (US); Roy Want, Los Altos, CA (US); Robert Douglas Fritz, III, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/654,140

(22) Filed: Oct. 17, 2012

Related U.S. Application Data

(60) Provisional application No. 61/548,158, filed on Oct. 17, 2011.

(51) Int. Cl.
*H04L 29/06* (2006.01)

(52) U.S. Cl.
USPC ....... 455/414.1; 455/404; 455/567; 455/41.1; 455/456.1; 455/517; 455/456.3; 455/456.4; 455/456.5; 455/456.6; 705/14.41; 705/14.45; 705/14.27; 705/1; 709/224; 709/218; 709/219; 709/226; 709/206

(58) Field of Classification Search
USPC ......... 455/404, 567, 41.1, 41.2, 414.1, 456.1, 455/456.3–456.6, 517; 705/14.41, 14.45, 705/14, 27, 1; 709/224, 218, 219, 226, 206
See application file for complete search history.

(56) References Cited

U.S. PATENT DOCUMENTS

| | | | |
|---|---|---|---|
| 7,210,100 B2 * | 4/2007 | Berger et al. | 715/229 |
| 7,565,605 B2 * | 7/2009 | Schohn et al. | 715/249 |
| 7,970,891 B1 * | 6/2011 | Kontothanssis et al. | 709/224 |
| 8,255,006 B1 * | 8/2012 | Chavez et al. | 455/567 |
| 2005/0136886 A1 * | 6/2005 | Aarnio et al. | 455/404.2 |
| 2005/0198035 A1 * | 9/2005 | Sundararajan et al. | 707/10 |
| 2008/0262928 A1 * | 10/2008 | Michaelis | 705/14 |
| 2012/0324542 A1 * | 12/2012 | Mclaughlin et al. | 726/4 |

* cited by examiner

*Primary Examiner* — Fayyaz Alam
*Assistant Examiner* — Ganiyu A Hanidu
(74) *Attorney, Agent, or Firm* — Shumaker & Sieffert, P.A.

(57) ABSTRACT

In general, techniques for using short range communication, such as near-field communication (NFC), to redirect the communication of a computing device to receive digital items selected at a kiosk may include receiving, by a computing device and from a kiosk computing device via a first communication pathway comprising short-range wireless communication, a device identifier associated with the kiosk computing device, wherein the kiosk computing device is operable to receive a selection of a digital item. The techniques may further include sending, by the computing device, a request for access to the digital item based at least in part on the device identifier associated with the kiosk computing device. The techniques may further include receiving, by the computing device via a second communication pathway, access to the digital item based at least in part on the device identifier.

27 Claims, 9 Drawing Sheets

COMMUNICATION REDIRECT VIA SHORT-RANGE COMMUNICATION FOR DIGITAL ITEM RETRIEVAL

This application claims the benefit of U.S. Provisional Application No. 61/548,158, filed Oct. 17, 2011.

TECHNICAL FIELD

The disclosure relates to receiving a digital item by a computing device.

BACKGROUND

Currently, computerized kiosks provide the ability for users to select and purchase items by interacting with the computerized kiosks. Some of the computerized kiosks may allow users to download purchased digital items from the computerized kiosks for execution or use on their mobile devices.

SUMMARY

In one example, the disclosure is directed to a method. The method may include receiving, by a computing device and from a kiosk computing device via a first communication pathway comprising a first short-range wireless communication pathway, a device identifier associated with the kiosk computing device, wherein the kiosk computing device is operable to receive a selection of a digital item, and wherein the device identifier does not identify the digital item. The method may further include sending, by the computing device, a request for access to the digital item based at least in part on the device identifier associated with the kiosk computing device. The method may further include, in response to sending the request, receiving, by the computing device via a second communication pathway, access to the digital item selected at the kiosk computing device based at least in part on the device identifier, the second communication pathway being different from the first communication pathway.

In another example, the disclosure is directed to a computing device. The computing device may include one or more processors. The computing device may further include a short-range wireless communication module configured to receive, via a first short-range wireless communication pathway and from a kiosk computing device, a device identifier associated with the kiosk computing device, wherein the kiosk computing device is operable to receive a selection of a digital item; wherein the one or more processors are configured to: send a request for access to the digital item based at least in part on the device identifier associated with the kiosk computing device, and in response to sending the request, receive, via a second communication pathway, the access to the digital item based at least in part on the device identifier.

In another example, the disclosure is directed to a computer-readable storage medium containing instructions. The instructions, when executed by at least one programmable processor, may cause the at least one programmable processor to perform operations. The operations may include receiving, by a computing device and from a kiosk computing device via a first communication pathway comprising a first short-range wireless communication pathway, a device identifier associated with the kiosk computing device, wherein the kiosk computing device is operable to receive a selection of a digital item. The operations may further include sending, by the computing device, a request for access to the digital item based at least in part on the device identifier associated with the kiosk computing device. The operations may further include, responsive to sending the request, receiving, by the computing device via a second communication pathway, the access to the digital item based at least in part on the device identifier.

In another example, the disclosure is directed to a method. The method may include receiving, by a kiosk computing device, a selection of a digital item. The method may further include sending, from the kiosk computing device to a computing device via a first communication pathway comprising a first short-range wireless communication pathway, a device identifier associated with the kiosk computing device that enables the computing device to access the digital item, wherein the digital identifier does not identify the digital item. The method may further include sending, by the kiosk computing device via a second communication pathway, an indication of the digital item for access by the computing device based at least in part on the device identifier, the second communication pathway being different from the first communication pathway.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
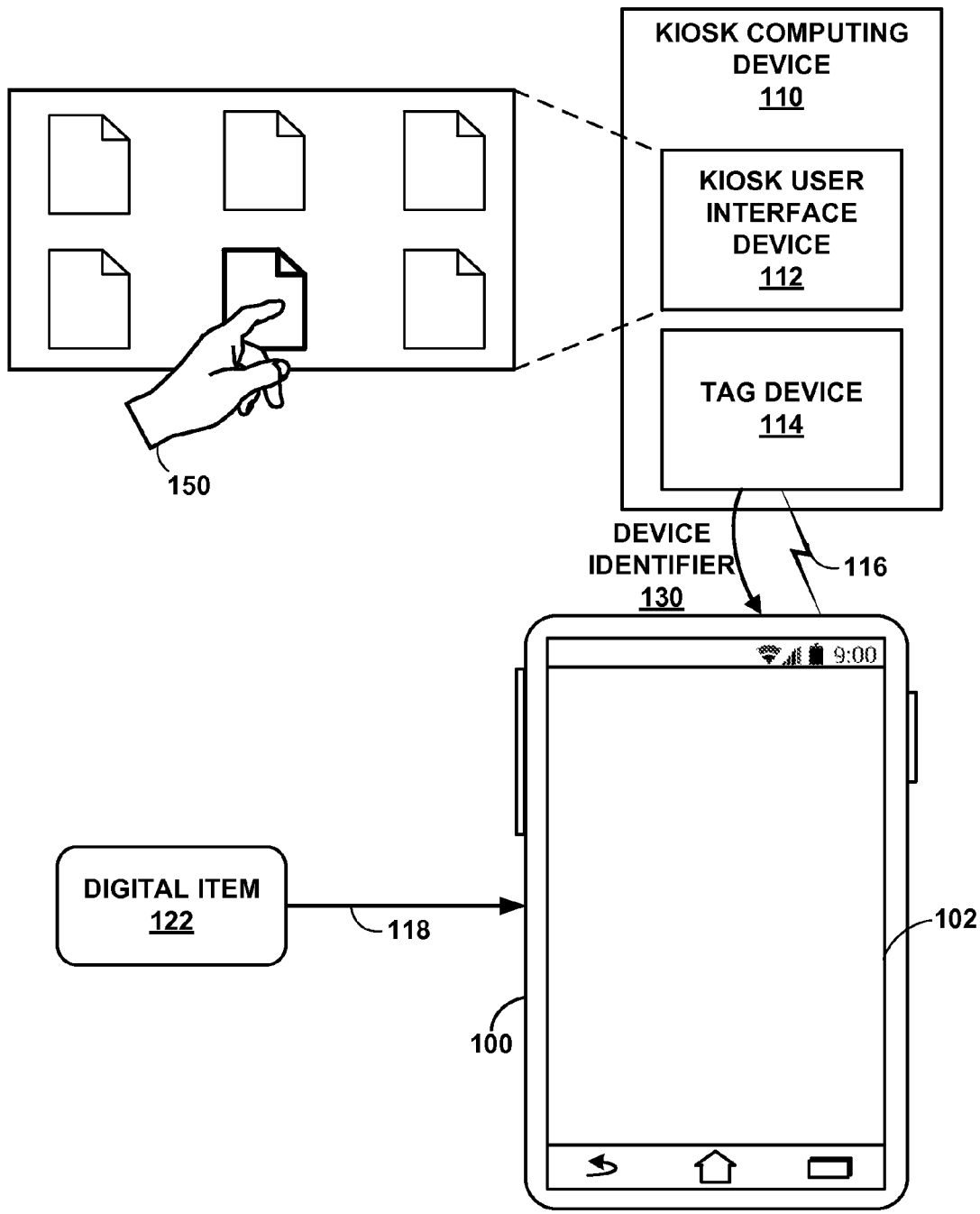
FIG. 1 is a block diagram illustrating an example computing device that is configured to receive access to digital items according to some aspects of the present disclosure.

In general, aspects of the disclosure are directed towards techniques for using short-range communication, such as near-field communication (NFC), to redirect the communication of a computing device to receive digital items selected at a kiosk device.

Typically, kiosk devices may provide a Quick Response (QR) code for each available digital item for download. A user may use his computing device, such as a mobile phone, to take a picture of a QR code corresponding to a digital item. The QR code may embed a universal resource locator (URL) that the computing device may then navigate to download the digital item. However, using a mobile computing device to take a picture of a QR code might be cumbersome because it may be difficult for the user to properly line up and focus the mobile computing device to take a legible photo of the QR code. Furthermore, if the QR code is dynamically generated at the kiosk device and displayed onto a display of the kiosk device, the light emitted from the display as well as any light reflected off of the display may saturate the camera sensor of the mobile computing device and may make it harder to take a legible photo of the QR code. In addition, activating the camera functionality of the mobile computing device may be cumbersome because the mobile computing device may have to be unlocked, the mobile computing device may have to exit out of the current running computer application, and the mobile computing device then may have to launch the camera application or a specialized QR code capture application.

Instead of presenting a QR code, a kiosk device may instead display a pass code corresponding to a selected item that the user may enter into his mobile computing device to enable his mobile computing device to download the selected digital content. However, entering the pass code into the computing device may also be cumbersome. For example, the mobile computing device may have to be unlocked, the mobile computing device may also have to exit out of the current running computer application, the mobile computing device may also have to launch a web browsing application, navigate to a page referenced by a specific URL, and receive the pass code entered by the user into the page referenced by the URL.

The kiosk device may also often require payment information, such as credit card information, to be directly into the kiosk device before the kiosk device displays the appropriate QR code or otherwise enable access to the selected digital item. Because entering payment information may, for example, require inputting credit card information such as the name, address, credit card number, credit card expiration date, and credit card security code, the user may spend a long time in front of the kiosk device entering the information. Requiring the user to enter payment information directly into the kiosk device may create security problems, such as another person looking over the user's shoulder or even looking at the kiosk display, if the kiosk display displays the payment information as the user enters that information. In addition, entering payment information directly into the kiosk device may also introduce unknowns, such as if the payment information is being stored by the kiosk device and, if so, the security employed by the kiosk device to protect such stored payment information.

Techniques of this disclosure may, in various aspects, enable a user to purchase and have digital items selected on a kiosk device be downloaded to his mobile computing device by selecting a digital item at the kiosk device when the mobile computing device, such as a mobile phone, is within a defined proximity of a tag device at the kiosk device. The kiosk device may dynamically display representations of digital items available for download or purchase, and a user may interact with the kiosk to browse through the digital items available to select a desired digital item. Responsive to the mobile computing device being placed in range of the tag device, the mobile computing device may gain access to the selected digital item, including downloading the selected digital item onto the mobile computing device. If payment information is required from the user before the mobile computing device is granted access to the selected digital item, the user may be able to enter the required payment information directly into the mobile computing device, allowing the mobile computing device to communicate the payment information to the kiosk device, instead of the user entering the payment information directly into the kiosk device.

The tag device of the kiosk device may be a passive tag, such as a passive near-field communication (NFC) tag. Due to potential limitations of the passive tag as to the amount of information that may be stored on and transmitted by the passive tag, the passive tag may, in some cases, only store and transmit the unique identity of the kiosk device, such as a universal resource locator (URL) associated with the kiosk device, to the mobile computing device. Furthermore, due to its passive nature, the passive tag may, in some instances, not receive any information regarding the digital item selected at the kiosk device in order to transmit that information to the mobile computing device. In some examples, the passive tag may only be able to transmit static information. Despite the potential limitations described above, advantages of using a passive tag as a tag device may include that passive tags are less complex compared to, for example, active tags, and thus may be less expensive to implement and may be less likely to malfunction than active tags.

To address the potential limitations of a passive NFC tag described above, the NFC tag may be able to redirect the mobile computing device it is in communications with to communicate with a remote system that has received information regarding the selected digital item at the kiosk device. The NFC tag may achieve the redirection by sending a URL that includes a unique identifier identifying the kiosk device to the mobile computing device. The kiosk device may also send the selected digital item (or the identity of the selected digital item) to the remote system. The mobile computing device may access a web page referenced by the URL that is provided by the remote system. The remote system may be able to determine the identity of the kiosk device based on the unique identifier included in the URL, and the remote system may be able to send the digital item selected at the kiosk device to the mobile computing device. In this fashion, digital items may be dynamically selected at the kiosk device and may be received by the mobile computing device based on the information provided by the passive NFC tag.

FIG. 1 is a block diagram illustrating an example computing device 100 that is configured to receive access to an example digital item 122. As shown in FIG. 1, kiosk computing device 110 may receive, at kiosk user interface device 112, a selection of digital item 122 by user 150. Computing device 100 may also communicate with tag device 114 associated with kiosk computing device 110, and tag device 114 may send to computing device 100 via a first communication pathway 116, device identifier 130 associated with kiosk computing device 110. Device identifier 130, in some examples, may be an identifier that uniquely identifies kiosk computing device 110 associated with the tag device 114. Computing device 100 may, based on device identifier 130, request and receive, via second communication pathway 118, access to digital item 122. In this way, computing device 100 may be able to receive access to digital item 122 that corresponds with the selection made at kiosk computing device 110.

In some examples, computing device 100 requesting access to digital item 122 may include accessing, by computing device 100, a web page referenced by a universal resource locator (URL) included in device identifier 130, and receiving access by computing device 100 to digital item 122 may include downloading, by computing device 100, digital item 122 from a remote server, accessing, by computing device 100, digital item 122 at a remote server, or receiving, by computing device 100, a token associated with digital item 122. In some examples, first communication pathway 116 may include a short-range communication pathway, such as NFC, between a passive NFC tag, such as tag device 114 and computing device 100. In some examples, second communication pathway 118 may include one or more communication pathways that are different than first communication pathway 116, including but not limited to other short-range communication pathways such as Bluetooth or radio-frequency identification (RFID), active NFC communication, wide area networks (WANs), local area networks (LANs), and the like.

Figure 2:
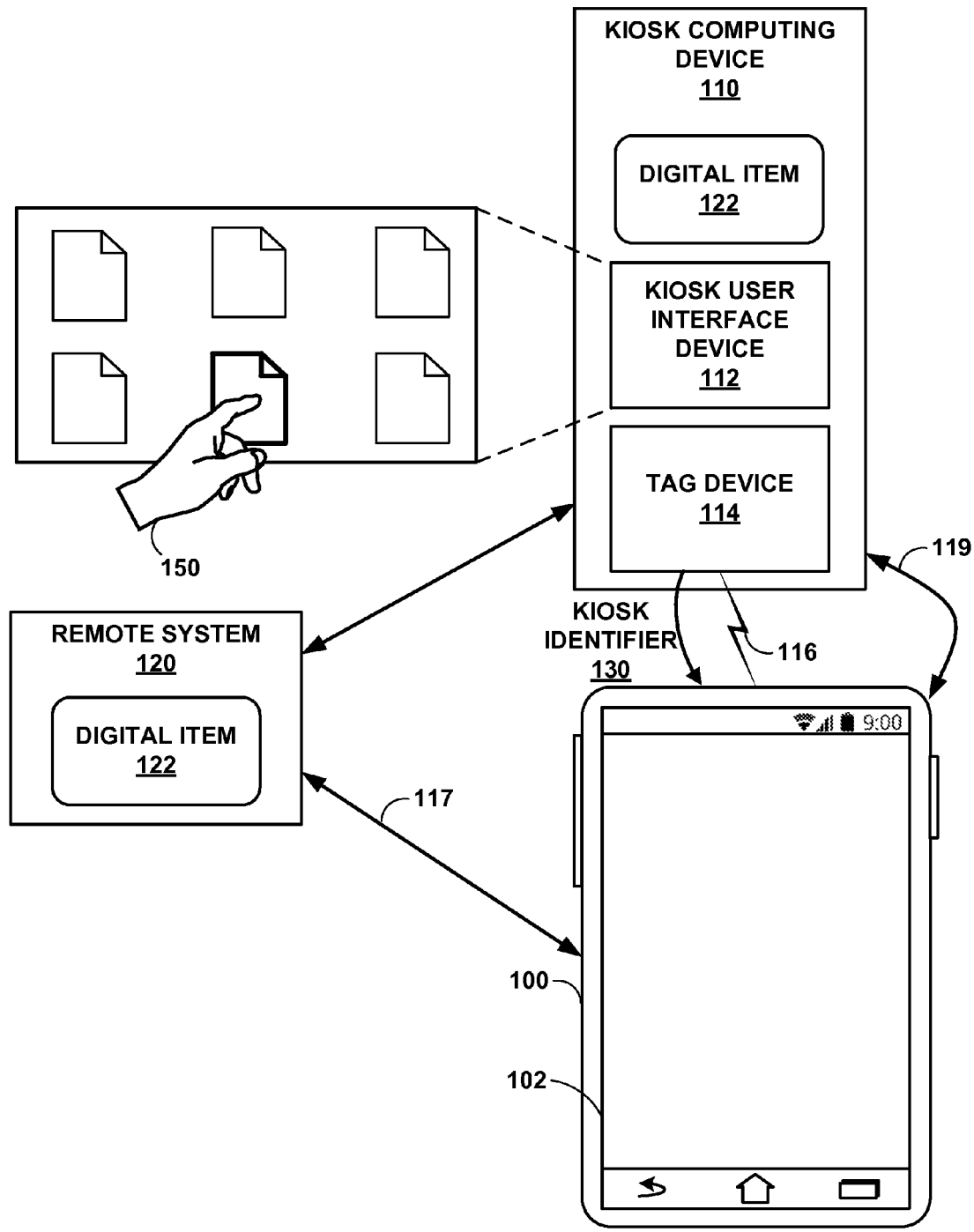
FIG. 2 is a block diagram illustrating an example computing device that is configured to receive access to digital items according to some aspects of the present disclosure.

FIG. 2 is another block diagram illustrating an example computing device 100 that is configured to receive access to an example digital item 122. As shown in FIG. 2, digital item 122 may be stored in kiosk computing device 110 and/or in remote system 120, and computing device 100 may be able to receive access to digital item 122 from kiosk computing device 110 or remote system 120. For example, kiosk computing device 110 may send digital item 122 to computing device 100 via kiosk communication pathway 119, or kiosk computing device 110 may make digital item 122 available to computing device 110 at remote system 120, and remote system 120 may in turn send digital item 122 to computing device 100 via remote communication pathway 117.

Digital item 122 may include any digital file, program, or media, including but not limited to an electronic book (e-book), a text file, an audio file, a video file, digital images, electronic documents, computer applications, directional information, and the like, including a combination of two or more of these items. The digital item 122 may be stored in the remote system 120, in the kiosk computing device 110, and/or in another external device (not shown).

In some examples, kiosk computing device 110 may not necessarily be a specialized kiosk. Instead, kiosk computing device 110 may be any computing device that is configured to present an interface for receiving the selection of digital item 122. Kiosk user interface device 112 may be any combination of devices capable of receiving input from user 150 and providing output to user 150, including but not limited to a presence-sensitive display. Kiosk computing device 110 may also include or be associated with tag device 114, such as a passive NFC tag, which may be configured to transmit device identifier 130 that uniquely identifies kiosk computing device 110. In some examples, digital item 122 may be stored in kiosk computing device 110.

In some examples, kiosk computing device 110 may include one or more zones, where a tag device such as tag device 114 may be associated with each zone of the one or more zones of kiosk computing device 110. In such an example, each zone may act like an individual kiosk computing device 110 having an associated tag device 114 that sends a device identifier identifying the specific zone associated with that tag device 114 to computing device 100.

Computing device 100 may be a mobile computing device, including but not limited to a mobile phone, a tablet computer, a personal digital assistant, a handheld computer, a media player, and the like, including a combination of two or more of these items. Computing device 100 may include display 102, such as a presence-sensitive display, that may receive input and provide output. For example, display 102 may be configured to output contents of digital item 122.

Remote system 120 may include but is not limited to one or more remote servers, one or more computing devices, or a cloud computing service. A cloud computing service may include one or more remote servers that may provide one or more services, including but not limited to computation, software, data access, and storage services, without requiring end-user knowledge of the physical location and configuration of the systems that deliver the one or more services. In some examples, one or more digital items, including digital item 122, may be stored in remote system 120.

Computing device 100 may include a short-range communication module, such as a near-field communication (NFC) module (not shown) capable of initiating short range wireless communication via first communication pathway 116 with tag device 114 associated with kiosk computing device 110 over a short distance. For example, this short distance may be less 100 meters, less than 10 meters, less than 1 meter, less than 10 centimeters, less than 5 centimeters, or even less than 4 centimeters. Although only one tag device 114 is provided in the example of FIG. 1, tag device 114 may be representative of any number of tag devices configured to communicate with computing device 100 using a short range communication protocol, such as an NFC protocol. Since each tag device 114 may be relatively simple and configured to communicate with any number of other NFC devices, computing device 100 may be capable of establishing communication with thousands or even millions of different location devices. In some examples, first communication pathway 116 may include an NFC network.

Computing device 100 may operate in at least two different modes to communicate with tag device 114 using first communication pathway 116, such as NFC. For example, computing device 100 and tag device 114 may be configured to operate in a passive mode and an active mode of operation. In an active mode of operation, computing device 100 may generate a first radio field that is received by tag device 114 in physical proximity to computing device 100. In response, tag device 114 may generate a second radio field that is received by computing device 100. In this way, data may be communicated between computing device 100 and tag device 114 such as using peer-to-peer communication. In the active mode, computing device 100 may also power or activate a passive device to retrieve data from the passive device, as further described below.

In a passive mode of operation, load modulation techniques may be employed to facilitate data communication between computing device 100 and tag device 114 via first communication pathway 116. In a passive mode, tag device 114 may not generate a radio field in response to the radio field of computing device 100. Instead, tag device 114 may include electrical hardware (e.g., an NFC module) that generates a change in impedance in response to the radio field generated by computing device 100. For example, computing device 100 may generate a radio field that is received by tag device 114. Electrical hardware in tag device 114 may generate a change in impedance in response to the radio field. The change in impedance may be detected by the NFC module of computing device 100. In this way, load modulation techniques may be used by computing device 100 to obtain device identifier 130 from tag device 114. In other words, computing device 100 may obtain device identifier 130 from tag device 114, but tag device 114 may not receive any data from computing device 100 in the passive mode. Other well-known modulation techniques including phase modulation and/or amplitude modulation may also be employed to facilitate data communication between computing device 100 and tag device 114 in other examples.

Tag device 114 may generally operate in passive mode. In passive mode, tag device 114 may be referred to as an NFC tag or NFC target. In other words, computing device 100 may include active NFC hardware and tag device 114 may include passive NFC hardware. Since a passive tag device 114 does not need a dedicated power supply, tag device 114 may be placed in a variety of locations, on any surface, or even as part of smaller items. For example, tag device 114 may be embodied as a sticker or adhesive poster that is placed on the wall of a building. Passive tag device 114 may also be less expensive and more difficult to corrupt with computing device 100. In this manner, tag device 114 may include electrical hardware that generates a change in impedance in response to a radio field. However, in other examples, tag device 114 may be another computing device. For example, tag device 114 may be a computing device that operates in a passive NFC mode and/or an active NFC mode. In other words, tag device 114 may include active NFC hardware. This active NFC hardware may be configured to emulate passive NFC hardware or participate in active near-field communication.

In one example of a passive tag device, tag device 114 may communicate device identifier 130 to the computing device 100 in response to receiving a radio field generated by the NFC module of computing device 100. In other words, device identifier 130 may be data stored on tag device 114. In response to receiving the radio field (e.g., receiving power sufficient to transmit data), computing device 100 may receive device identifier 130 from tag device 114. In this manner, tag device 114 may only be capable of delivering or sending device identifier 130 if computing device 100 is within close physical proximity to tag device 114. Although a user may physically touch, bump, or tap computing device 100 to tag device 114, computing device 100 may be capable of receiving device identifier 130 from tag device 114 without physically touching tag device 114. In some examples, the techniques of this disclosure may be applicable to other types of computer-readable short range communication signals and devices, including but not limited to Bluetooth, radio frequency identification (RFID) tags, quick response (QR) codes, bar codes, and the like.

In some examples, the device identifier 130 does not include the digital item 122 itself nor does it include any indications as to the identity of the digital item 122. Instead, the device identifier 130 may simply act as an identifier for kiosk computing device 110. In this manner, device identifier 130 may instruct computing device 100 to communicate with kiosk computing device 110 via kiosk communication pathway 119, or to communicate with remote system 120 via remote communication pathway 117. In some examples, both kiosk communication pathway 119 and remote communication pathway 117 may be considered second communication pathway 118 shown in FIG. 1.

In some examples, computing device 100 may request and receive access to digital item 122 by communicating via remote communication pathway 117 with remote system 120 based on device identifier 130. Device identifier 130 may include a universal resource locator (URL) that references an Internet resource within remote system 120 that includes or redirects to digital item 122. The URL may also include an identifier, such as a unique name, associated with kiosk computing device 110, so that remote system 120 may be able to identify kiosk computing device 110 based on the URL. In response to receiving device identifier 130 from tag device 114, computing device 100 may send a request for access to the Internet resource referenced by the URL included in device identifier 130. In some examples, computing device 100 may navigate, without user intervention, to the Internet resource referenced by the URL, in response to receiving device identifier 130. In some examples, computing device 100 may display a confirmation dialog at display 102 to confirm that computing device 100 will navigate to the Internet resource referenced by the URL. In some examples, the Internet resource referenced by the URL may be a web page hosted on remote system 120, and accessing the Internet resource referenced by the URL may include sending a request from computing device 100 to remote system 120 to access the Internet resource referenced by the URL.

Because the URL may include an identifier associated with kiosk computing device 110, remote system 120 may, responsive to receiving the request from computing device 100 for access the Internet resource referenced by the URL, be able to identify kiosk computing device 110 or an Internet resource associated with kiosk computing device 110 based on the URL. For example, an example URL may be "http://www.example.com/kiosk/". The "www.example.com" domain referenced by the example URL may be hosted on the remote system 120, and the specific "kiosk" web page referenced by the URL may uniquely identify the kiosk computing device 110 to the remote system. In some examples, other identifiers that uniquely identify the kiosk computing device 110 may be embedded within the URL in any other suitable fashion.

Responsive to kiosk computing device 110 receiving a selection of digital item 122, kiosk computing device 110 may send to remote system 120 the identity of digital item 122. In some examples, remote system 120 may query kiosk computing device 100 for the identity of digital item 122, and kiosk computing device 110 may, in response, send identity of the digital item 122 to remote system 120. In some examples, remote system 120 may contain a database of kiosk-digital item associations, and remote system 120 may be able to identify digital item 122 by querying the database based on the identity of kiosk computing device 110. In some examples, kiosk computing device 110 may send the digital item 122 to the remote system 120. In other examples, kiosk computing device 110 may send a redirection pointer to remote system 120 that redirects to digital item 122 in remote system 120, and remote system 120 may insert the redirection pointer into the Internet resource referenced by the URL included in kiosk identifier 130, so that computing device 100 may be redirected to digital item 122 if computing device 100 accesses the Internet resource referenced by the URL.

After determining digital item 122 associated with the selection received by kiosk computing device 110, remote system 120 may allow the computing device 100 access to digital item 122. In some non-limiting examples, remote system 120 may send a request for payment information to purchase or rent digital item 122 to computing device 100 and may grant computing device 100 access to the digital item only after receiving and verifying the payment information. A user may enter the payment information directly into computing device 100, which may be more secure than the user entering payment information into kiosk computing device 110 for the reasons previously discussed above. A user may also have payment information already stored on computing device 100 and the user may be able to send the stored payment information to remote system 120 without needing to re-enter payment information.

In some examples, receiving, by computing device 100, access to digital item 122 may include receiving the contents of digital item 122. In some examples, receiving, by the computing device 100, access to the digital item 122 may include receiving a token, such as a URL, that references the digital item. The computing device 100 may be able to access the digital item 122 by accessing the Internet resource associated with the URL. In some examples, digital item 122 may be sent to computing device 100 without requiring payment information.

In some examples, computing device 100 may receive access to digital item 122 by communicating directly via kiosk communication pathway 119 with kiosk computing device 110 without communicating with remote system 120. Device identifier 130 may include instructions for communicating with kiosk computing device 110. The instructions, in some examples, may be embedded within an URL included in device identifier 130. Responsive to computing device 100 receiving device identifier 130 from tag device 114 via first communication pathway 116, computing device 100 may contact kiosk computing device 110 based at least in part on device identifier 130 to receive access to digital item 122 directly from kiosk computing device 110 via kiosk communication pathway 119.

Computing device 100 may be able to determine whether to receive access to digital item 122 from kiosk computing device 110 or remote system 120 if both choices are available to computing device 100. For example, remote communication pathway 117 may be a wide area network (WAN) wireless connection (such as a cellular data connection), and kiosk communication pathway 119 may be a local area network (LAN) wireless connection (such as a Wi-Fi connection). In this case, because the LAN wireless connection may support higher bandwidth transfers than the WAN wireless connection, computing device 100 may decide to receive access to digital item 122 via kiosk communication pathway 119 from kiosk computing device 110.

In some examples, the bandwidth of computing device 100's network connections may affect how computing device 100 accesses digital item 122. For example, if computing device 100 is receiving access to digital item 122 via a higher bandwidth connection (such as via a LAN), computing device 100 may receive the entire contents of digital item 122. In contrast, if computing device 100 is instead receiving access to digital item 122 via a lower bandwidth connection (such as via a WAN), computing device 100 may only receive a URL that references digital item 122, so that computing device 100 may be able to access the URL at a later time to access digital item 122 if computing device 100 is on a higher bandwidth connection.

In some examples, kiosk computing device 110 may serve as a virtual bookshelf system for a bookstore cloud service, such as provided by remote system 120. Kiosk user interface device 112 may include a presence-sensitive display that may dynamically display representations of virtual books, and user 150 may be able to interact with kiosk 110 by contacting and performing one or more gestures or swipes on the presence-sensitive display, to browse the virtual bookshelf system. If user 150 finds a desired book, user 150 may be able to interact with the presence-sensitive display to enlarge and to virtually thumb through the book's pages, and to make a selection of a book to download.

The presence-sensitive display may display a caption that indicates the book may be purchased by waving user 150's computing device 100 over a "purchase book" tag in a zone besides the presence-sensitive display. Tag device 114 associated with kiosk computing device 110 may be situated on or near an area besides the presence-sensitive display. Responsive to scanning tag device 114, computing device 100 may receive from tag device 114 device identifier 130 including a URL that references the bookstore cloud service. A web browser or other application in computing device 100 may access, via a wireless network connection, a web page within the bookstore cloud service referenced by the URL. Responsive to receiving a request from computing device 100 for the web page referenced by the URL, the bookstore cloud service may look up the name of the currently selected book in kiosk computing device 110 based on the identify of kiosk computing device 110 included in the URL. Responsive to the bookstore cloud service receiving the identity of the currently selected book, the bookstore cloud service may serve to the computing device 100 a web page that represents the book and includes a payment form.

Responsive to the user 150 filling out the payment form in computing device 100 with payment information and submitting the payment form, or otherwise sending payment information stored in computing device 100, the bookstore cloud service may verify the payment information and may send the complete book to computing device 100. Alternatively, the bookstore cloud service may send a unique URL referencing the book to computing device 100.

In some examples, kiosk computing device 110 may be a kiosk for providing directional information, such as at a mall or shopping center, and computing device 100 may be able to receive access to digital items containing directional information. Kiosk computing device 110 at a shopping center may display at kiosk user interface device 112 a directory of stores at the shopping center. Kiosk user interface device 112 may include a presence-sensitive display that enables user 150 to interact with kiosk user interface device 112 to find and select a store within the shopping center. Responsive to user 150 "tapping" computing device 100 against tag device 114 associated with kiosk computing device 110, computing device 100 may retrieve a digital item including directional information from the location of kiosk computing device 110 to the store selected via kiosk user interface device 112. The directional information may include maps, text directions, and/or audio/visual directions directing the user to the selected store. In some examples, kiosk computing device 100 at a shopping center may be able to dispense coupons included in the digital items.

Figure 3:
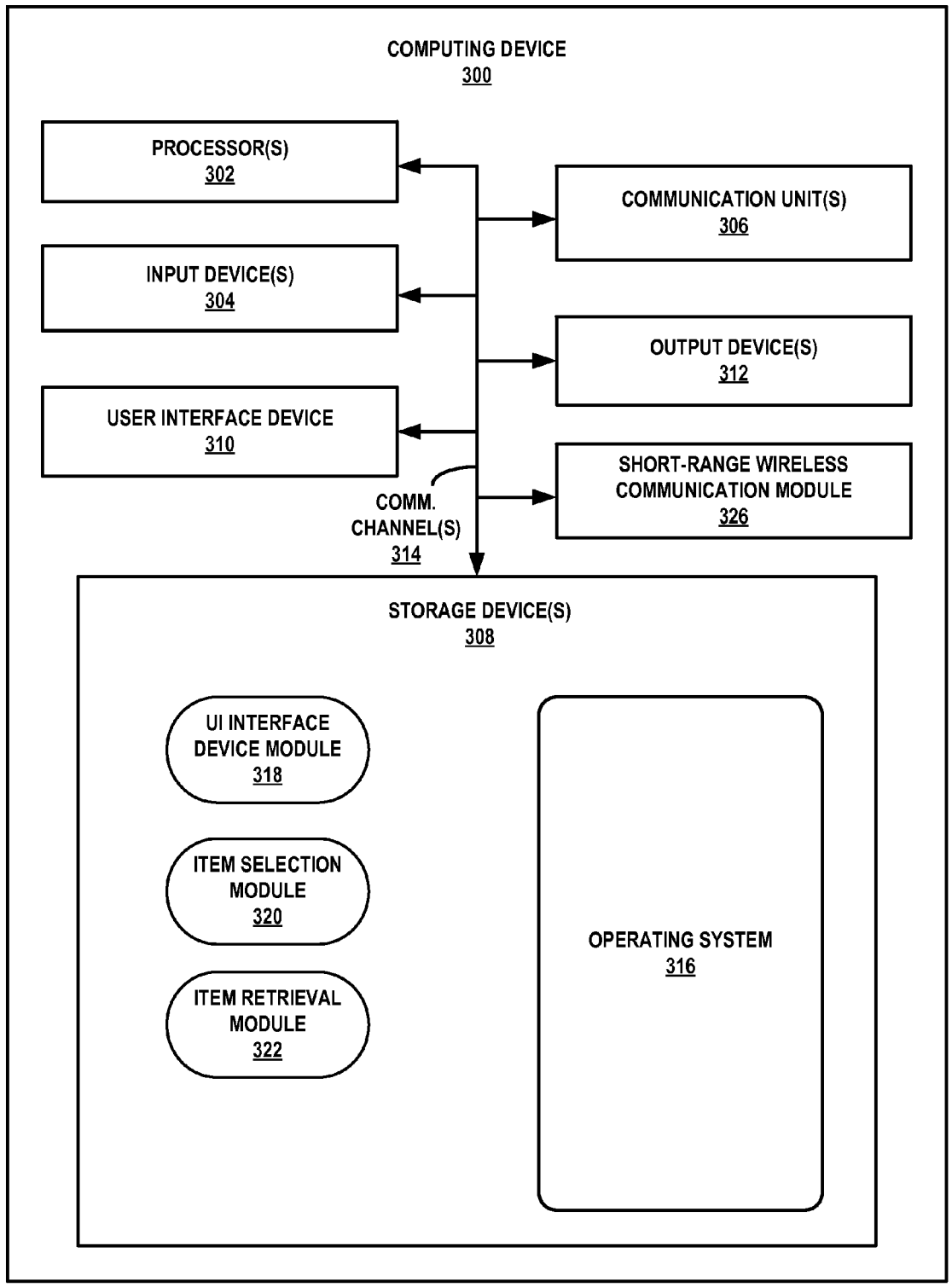
FIG. 3 is a block diagram illustrating an example computing device according to some aspects of the present disclosure.

FIG. 3 is a block diagram illustrating further details of one example of a computing device, remote system, or a kiosk computing device shown in FIG. 1 and FIG. 2, in accordance with one or more techniques of the present disclosure. FIG. 3 illustrates only one particular example of computing device 100 or kiosk computing device 110 as shown in FIG. 1 and FIG. 2, and many other examples of computing device 100 or kiosk computing device 110 may be used in other instances. Although shown in FIG. 3 as a stand-alone computing device 300 for purposes of example, a computing device may be any component or system that includes one or more processors or other suitable computing environment for executing software instructions and, for example, need not necessarily include one or more elements shown in FIG. 3 (e.g., input devices 304, user interface devices 310, output devices 312).

As shown in the specific example of FIG. 3, computing device 300, which may comprise one non-limiting example of computing device 100, remote system 120, and/or kiosk computing device 110 shown in FIG. 1 and FIG. 2, includes one or more processors 302, one or more input devices 304, one or more communication units 306, one or more output devices 312, one or more storage devices 308, and user interface (UI) device 310. Computing device 300, in one example, further includes UI module 318, and operating system 316 that are executable by computing device 300. Computing device 300, in one example, further includes item selection module 320 and item retrieval module 322. Each of components 302, 304, 306, 308, 310, and 312 are coupled (physically, communicatively, and/or operatively) for inter-component communications. In some examples, communication channels 314 may include a system bus, a network connection, an inter-process communication data structure, or any other method for communicating data. As one example in FIG. 3, components 302, 304, 306, 308, 310, and 312 may be coupled by one or more communication channels 314. UI module 318 may also communicate information with one another as well as with other components in computing device 300, such as item selection module 320 and item retrieval module 322.

Processors 302, in one example, are configured to implement functionality and/or process instructions for execution within computing device 300. For example, processors 302 may be capable of processing instructions stored in storage device 308. Examples of processors 302 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 308 may be configured to store information within computing device 300 during operation. Storage device 308, in some examples, is described as a computer-readable storage medium. In some examples, storage device 308 is a temporary memory, meaning that a primary purpose of storage device 308 is not long-term storage. Storage device 308, in some examples, is described as a volatile memory, meaning that storage device 308 does not maintain stored contents when the computer is turned off. Examples of volatile memories include random access memories (RAM), dynamic random access memories (DRAM), static random access memories (SRAM), and other forms of volatile memories known in the art. In some examples, storage device 308 is used to store program instructions for execution by processors 302. Storage device 308, in one example, is used by software or applications running on computing device 300 (e.g., gesture module 320) to temporarily store information during program execution.

Storage devices 308, in some examples, also include one or more computer-readable storage media. Storage devices 308 may be configured to store larger amounts of information than volatile memory. Storage devices 308 may further be configured for long-term storage of information. In some examples, storage devices 308 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 300, in some examples, also includes one or more communication units 306. Computing device 300, in one example, utilizes communication unit 306 to communicate with external devices via one or more networks, such as one or more wireless networks. Communication unit 306 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 300 utilizes communication unit 306 to wirelessly communicate with an external device such as a server.

In addition, the computing device 300 may include short-range wireless communication module 326. As described herein, short-range wireless communication module 326 may be active hardware that is configured to communicate with other short-range communication devices. In general, short-range wireless communication module 326 may be configured to communicate wirelessly with other devices in physical proximity to short-range wireless communication module 326 (e.g., less than approximately ten centimeters, or less than approximately four centimeters). In some examples, short-range communication module 326 may include a near-field communication (NFC) module that communicates via NFC. In other examples short-range wireless communication module 326 may be replaced with an alternative short-range communication device configured to communicate with and receive data from other short range communication sensors. These alternative short-range communication devices may operate according to Bluetooth, Ultra-Wideband radio, or other similar protocols. In some examples, short-range wireless communication module 326 may be an external hardware module that is coupled with computing device 300 via a bus (such as via a Universal Serial Bus (USB) port). Short-range wireless communication module 326, in some examples, may also include software which may, in some examples, be independent from operating system 316, and which may, in some other examples, be a sub-routine of operating system 316. In some examples, if computing device 300 is similar to kiosk computing device 110 in FIG. 1, then short-range wireless communication module 326 may include a passive tag device similar to tag device 114 in FIG. 1

Computing device 300, in one example, also includes one or more input devices 304. Input device 304, in some examples, is configured to receive input from a user through tactile, audio, or video feedback. Examples of input device 304 include a presence-sensitive display, a mouse, a keyboard, a voice responsive system, video camera, microphone or any other type of device for detecting a command from a user. In some examples, a presence-sensitive display includes a touch-sensitive screen.

One or more output devices 312 may also be included in computing device 300. Output device 312, in some examples, is configured to provide output to a user using tactile, audio, or video stimuli. Output device 312, in one example, includes a presence-sensitive display, a sound card, a video graphics adapter card, or any other type of device for converting a signal into an appropriate form understandable to humans or machines. Additional examples of output device 312 include a speaker, a cathode ray tube (CRT) monitor, a liquid crystal display (LCD), or any other type of device that can generate intelligible output to a user. In some examples, UI device 310 may include functionality of input device 304 and/or output device 312. In the example of FIG. 1 and FIG. 2, UI device 312 may be a presence-sensitive display.

Computing device 300 may include operating system 316. Operating system 316, in some examples, controls the operation of components of computing device 300. For example, operating system 316, in one example, facilitates the communication of UI module 318 with processors 302, communication unit 306, storage device 308, input device 304, user interface device 310, short-range wireless communication module 326, and output device 312. UI module 318 may also include program instructions and/or data that are executable by computing device 300. As one example, UI module 318 may include instructions that cause computing device 300 to perform one or more of the operations and actions described in the present disclosure.

If computing device 300 is a kiosk computing device, such as kiosk computing device 110 in FIG. 1 and FIG. 2, UI interface device module 318 may display a plurality of digital items at user interface device 312, such as a presence-sensitive screen. Furthermore, if a user, such as user 150 shown in FIG. 1 and FIG. 2, selects an item displayed at user interface device 310, user interface device 310 may detect the selection, and UI interface device module 318 may receive the selection. Item selection module 320 may determine if a digital item is selected based on the user input and, if so, may also determine the selected digital item. Item selection module 320 may also communicate an indication of the selected digital item, such as to a remote server (e.g., remote server 120 in FIG. 2) or to another computing device (e.g., computing device 100 in FIG. 1 and FIG. 2) via communication units 306. In some examples, the indication of the digital item may be the digital item itself, a redirect to the digital item, or any other suitable indication of the selected digital item.

If computing device 300 is a computing device that interacts with a kiosk computing device, such as a computing device 100 that interacts with kiosk computing device 110 in FIG. 1 and FIG. 2, UI interface device module 318 may, responsive to short-range wireless communication module 326 of computing device 300 communicating with the tag device of a kiosk computing device, such as tag device 114 of kiosk computing device 110 in FIG. 1 and FIG. 2, display a hyperlink for accessing the digital item selected at the kiosk computing device. If a user, such as user 150 shown in FIG. 1 and FIG. 2, selects the hyperlink displayed at user interface device 310 of computing device 300, user interface device 310 may detect the selection, and UI interface device module 318 may receive the selection. Responsive to UI interface device module 318 receiving the selection of the hyperlink, item retrieval module 322 may access the Internet resource referenced by the hyperlink. For example, item retrieval module 322 may be a web browser that browses the Internet resource referenced by the hyperlink via communication unit 306 and displays the contents of the Internet resource at user interface device 310 of computing device 300.

Figure 4A:
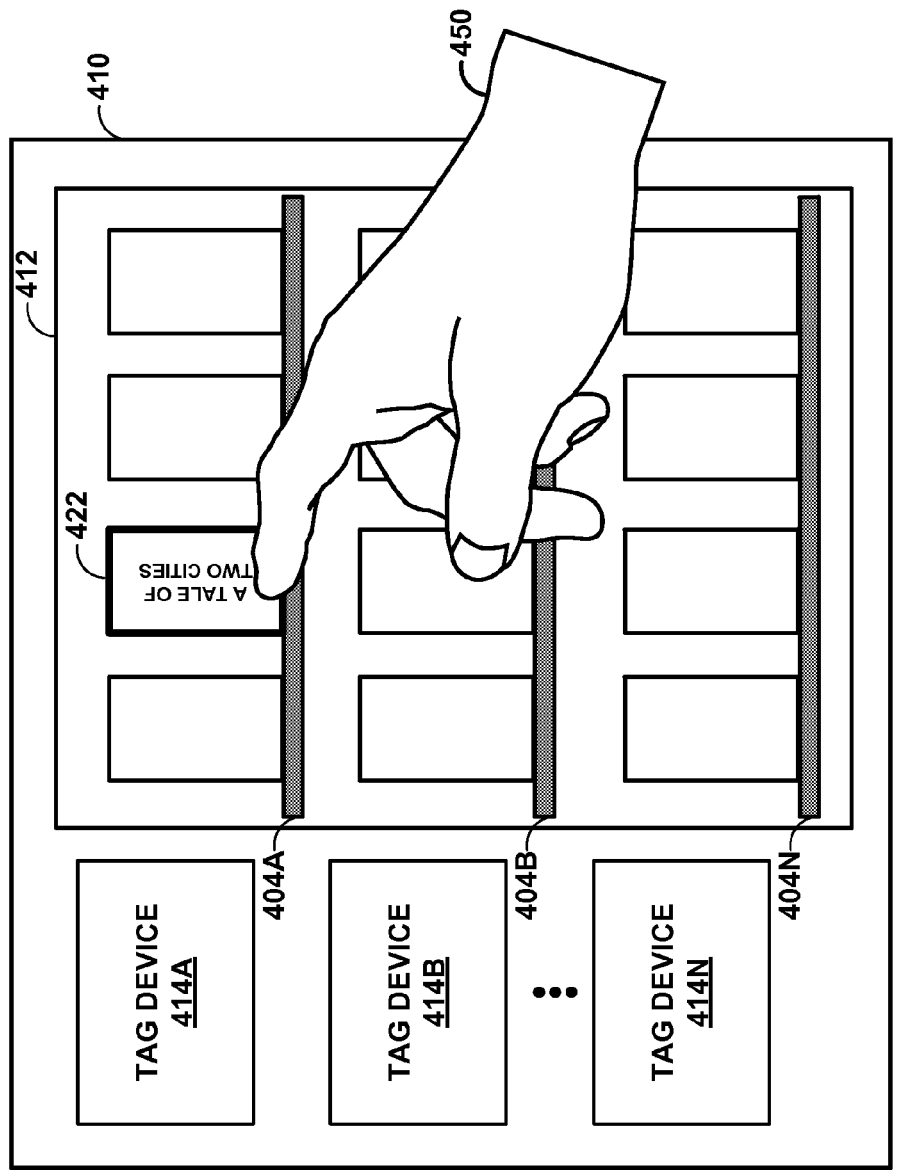
FIGS. 4A-4D are conceptual diagrams illustrating an example technique for communicating digital items according to some aspects of the present disclosure.

FIGS. 4A-4D are conceptual diagrams illustrating an example technique for communicating digital items according to aspects of the present disclosure. As shown in FIG. 4A, kiosk computing device 410, similar to kiosk computing device 110 in FIG. 1 and FIG. 2, may include kiosk user interface device 412. Kiosk user interface device 412 of kiosk computing device 410 may, in some examples, be a presence-sensitive screen/display. Kiosk user interface device 412 may display a plurality of digital items and may receive input from a user 450 selecting digital item 422 out of the plurality of digital items displayed at kiosk user interface device 412. The user interface displayed at kiosk user interface device 412 may be divided into a one or more zones 404A-N (hereafter "zones 404"). In the example shown in FIG. 4A, each representation of a bookshelf in the user interface may denote a zone in zones 404.

Kiosk computing device 410 may include one or more tag devices 414A-414N (hereafter "tag devices 414") where each tag device in tag devices 414 may be associated with a zone in zone 404. For example, tag device 414A may be associated with zone 404A and tag device 414B may be associated with zone 404B. Tag devices 414, similar to tag device 114 shown in FIG. 1 and FIG. 2, may be a short-range wireless communication device, such as an NFC device, an RFID device, a Bluetooth device. In some examples, tag devices 414 may be a passive short-range wireless communication device, such as an NFC tag, that is able to transmit static information but is not able to transmit dynamic information to or to receive any information from a short-range wireless communication device.

Figure 4B:
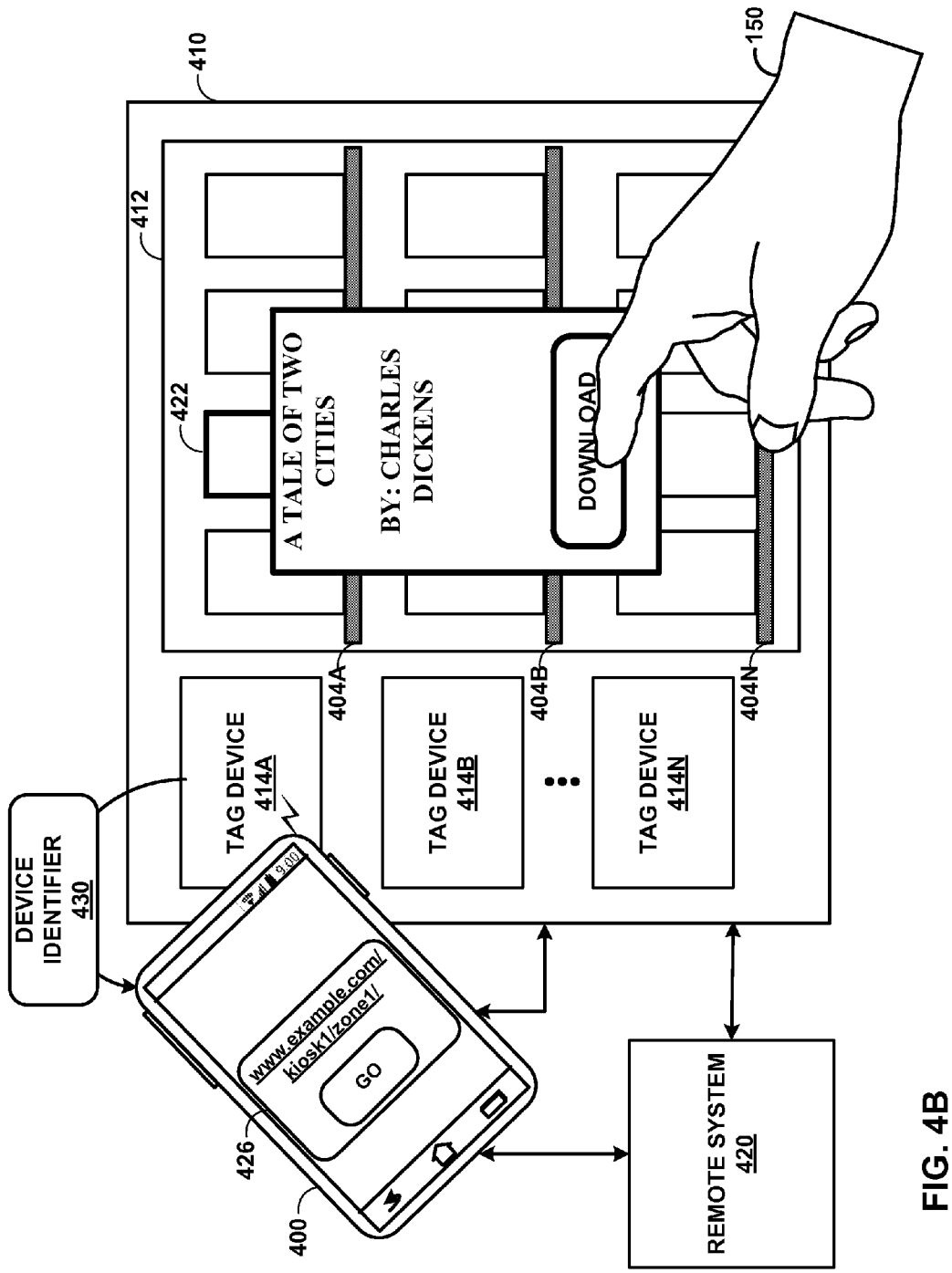

As shown in FIG. 4B, in response to receiving a selection of digital item 422 from user 450, kiosk user interface device 412 may display a detailed view of the selected digital item 422 and may display a prompt for user to download the digital item to user 450's computing device 400 (e.g., the user's mobile phone). In some examples, kiosk user interface device 412 may also display options that, if selected, may display the table of contents, or may allow user 450 to interact with kiosk user interface device 412 to preview a portion of the contents of digital item 422.

Because digital item 422 is located in zone 404A, computing device 400 may receive device identifier 430 that uniquely identifies kiosk computing device 410 and zone 404A by being tapped or bumped against the corresponding tag device 414A associated with zone 404A, or by being placed within a specified short-range vicinity of the corresponding tag device 414A associated with zone 404A, to communicate with tag device 414 via short-range wireless communication, such as NFC. In response to short-range wireless communication being established between computing device 400 and tag device 414A, tag device 404A may send device identifier 430 to computing device 400. Because tag device 414 may be a passive tag device, device identifier 1430 may be static data that does not change and does not include an indication as to the selected digital item. In some examples, device identifier 430 may be a URL that points to an Internet resource associated with zone 404A of kiosk 410, such as "www.example.com/kioskl/zonel/", which may uniquely identify zone 404A of kiosk computing device 410.

Because tag device 414 may be a passive tag device that may potentially be unable to dynamically update data stored within it, tag device 414 may potentially not receive any indication of the digital item that was selected. Thus, in response to receiving the selection of digital item 422 in zone 404A, kiosk computing device 410 may modify the contents of the Internet resource referenced by the URL in device identifier 430 to include the contents of digital item 422. For example, if digital item 422 comprises the novel "A Tale of Two Cities" and if the URL in the device identifier comprises "www.example.com/kioskl/zonel/", kiosk computing device 410 may modify the Internet resource referenced by that URL, or cause that internet resource to be modified, so that it includes the contents of the novel "A Tale of Two Cities." Alternatively, kiosk computing device 410 may insert a redirection pointer into the Internet resource referenced by the URL in device identifier 430 to redirect from the Internet resource to the digital item 422.

The Internet resource referenced by device identifier 430 may be stored in remote system 420 that is remote to computing device 400 and kiosk computing device 410, or may be stored in kiosk computing device 410. If the Internet resource is stored in remote system 420, then kiosk computing device 410 may communicate an indication of the selected digital item 422 to remote system 420, such that remote system 420 may modify the Internet resource to include the contents of digital item 422. For example, if remote system 420 stores digital items offered at kiosk computing device 410, including digital item 422, then, in response to receiving the indication of the selected digital item 422, remote system 420 may select digital item 422 out of the digital items stored in remote system 420 based on the indication and may modify the Internet resource to include the contents of digital item 422. Alternatively, if remote system 420 does not already store the selected digital item 422, the indication sent from kiosk computing device 110 to remote system 420 may include contents of digital item 422. In response to receiving the contents of digital item 422, remote system 420 may modify the Internet resource to include the contents of digital item 422.

If the Internet resource is stored in kiosk computing device 410, such as if kiosk computing device 410 includes a web server, kiosk computing device 410 may update the Internet resource to include the contents of digital item 422 in response to receiving a selection of digital item 422 from user 450. In response to receiving device identifier 430 from tag device 414A, computing device 400 may display prompt 426 at display 402 that, if selected, enables computing device 400 to request access to the Internet resource referenced in device identifier 430. In some examples, in response to receiving device identifier 430 from tag device 414A, computing device 400 may automatically, and without user intervention, request access to the Internet resource referenced in device identifier 430.

Figure 4C:
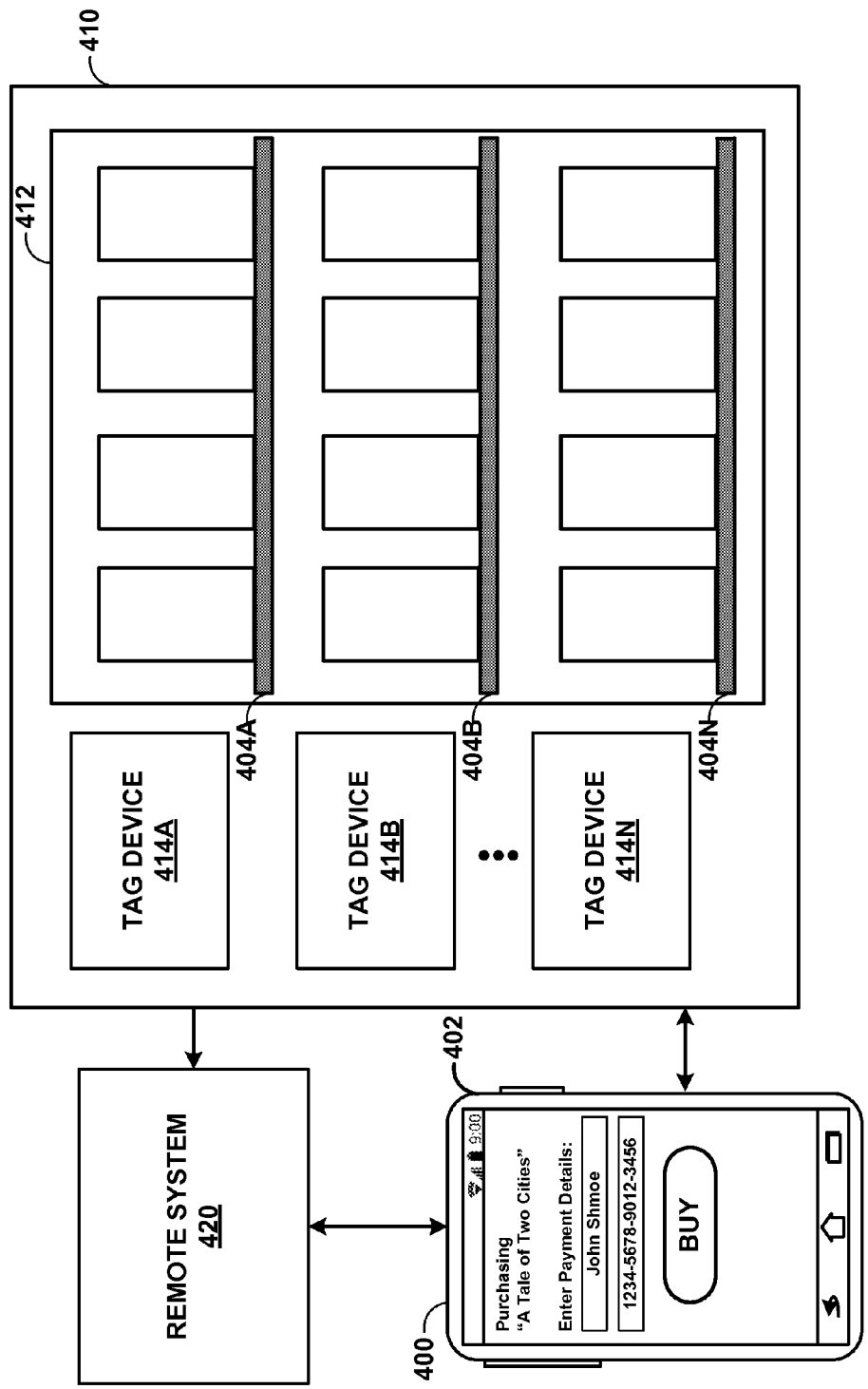

As shown in FIG. 4C, in response to computing device 400 communicating with remote system 120 or kiosk computing device 410 to request access to the Internet resource referenced in device identifier 430, and if digital item 422 has an associated fee for purchasing access to digital item 422, computing device 400 may display at display 402 a prompt user 450 to enter payment information to purchase access to digital item 422.

Figure 4D:
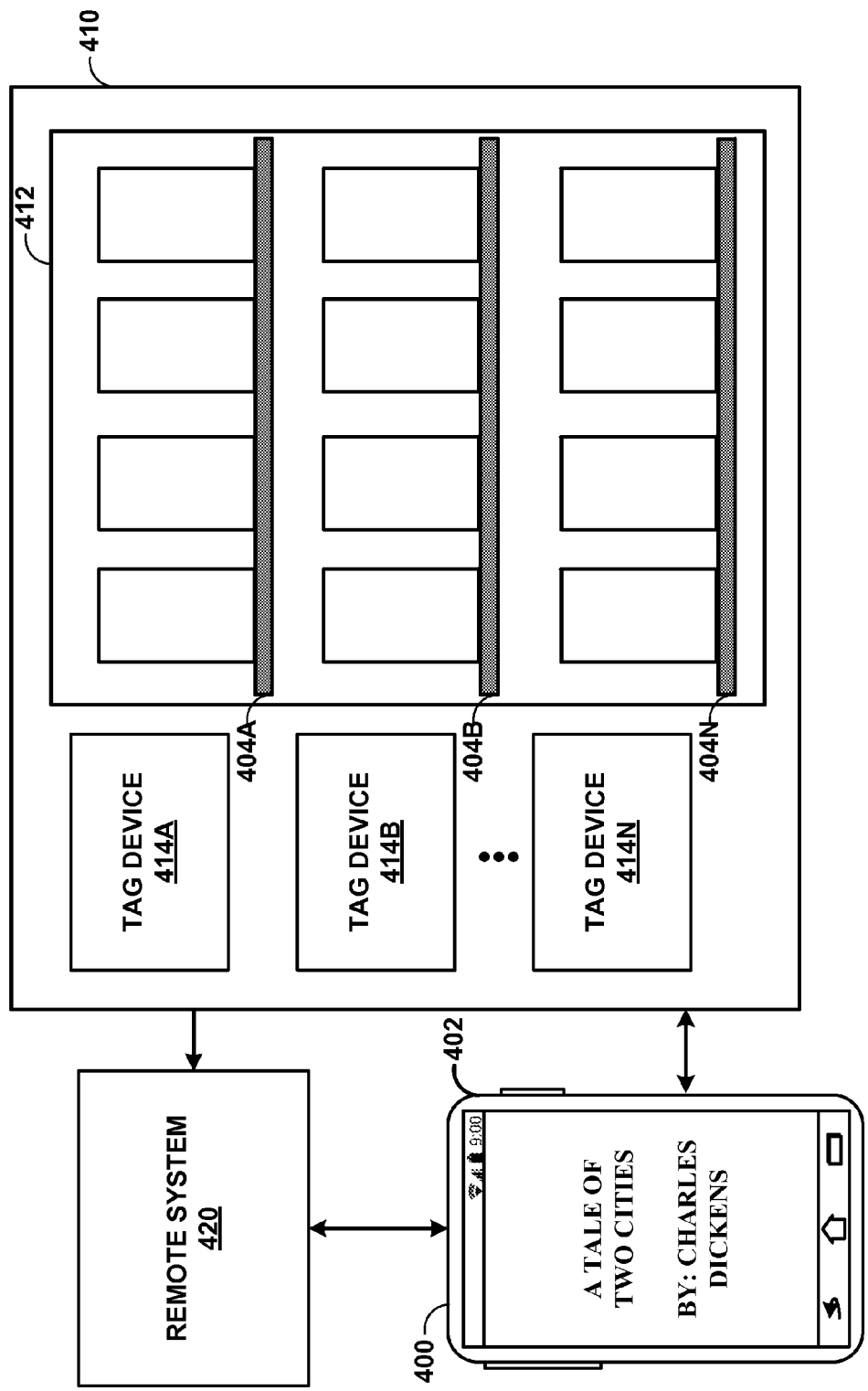

As shown in FIG. 4D, in response to payment information being entered at computing device 400 or if digital item 422 is accessible without a fee, computing device 400 may receive access to digital item 422. For example, computing device 400 may be able to freely view the contents of digital item 422.

Figure 5:
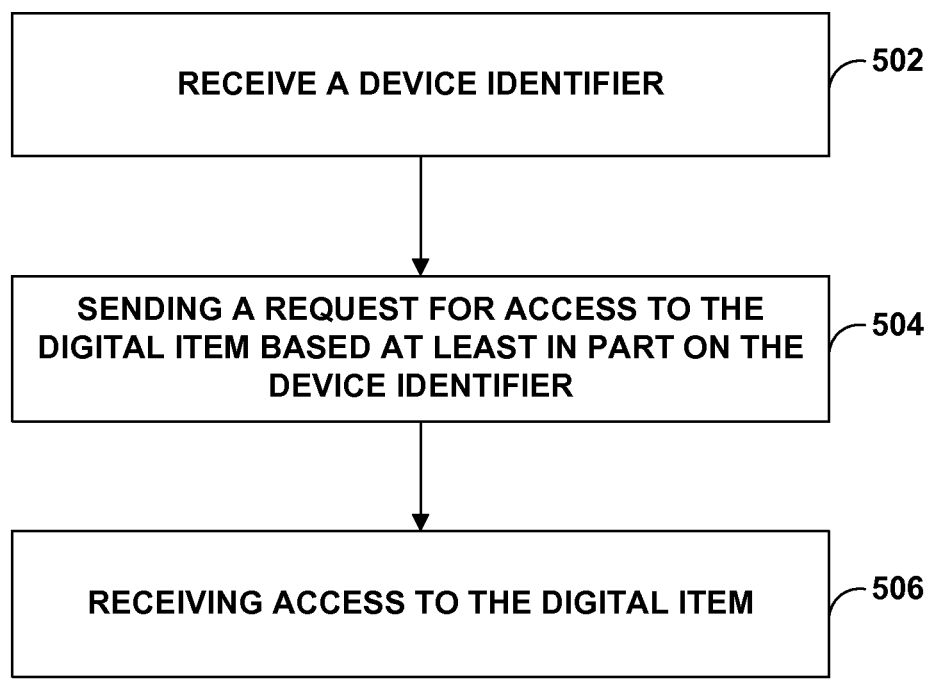
FIG. 5 is a flowchart illustrating an example process to receive access to a digital item according to some aspects of the present disclosure.

FIG. 5 is a flow chart illustrating an example process that may be performed by an example computing device, such as computing device 100 of FIG. 1, to receive access to a digital item, such as digital item 122 of FIG. 1. The process may include receiving, by a computing device 100 and from a kiosk computing device 110 via a first communication pathway 116 comprising a first short-range wireless communication pathway, a device identifier 130 associated with the kiosk computing device 110, wherein the kiosk computing device 110 is operable to receive a selection of a digital item 122, and wherein the device identifier does not identify the digital item (502). The process may further include sending, by the computing device 100, a request for access to the digital item 122 based at least in part on the device identifier 130 associated with the kiosk computing device 110 (504). The process may further include in response to sending the request, receiving, by the computing device via a second communication pathway, access to the digital item selected at the kiosk computing device based at least in part on the device identifier, the second communication pathway being different from the first communication pathway (506).

In some examples, sending, by the computing device, the request for access to the digital item may further include sending, by the computing device 100 to a remote system 120, the request for access to the digital item 122 based at least in part on the device identifier 130 associated with the kiosk computing device 110. Receiving the access to the digital item may further include receiving, by the computing device 100, the access to the digital item 122 at the remote system 120. Receiving the access to the digital system may also include receiving, by the computing device 100, the digital item 122 from the remote system 120. In some examples, the remote system 120 identifies the kiosk computing device 110 based at least in part on the device identifier 130 associated with the kiosk computing device 110. In some examples, the device identifier 130 may further include a universal resource locator (URL) that references an Internet resource provided by the remote system 120. In some examples, sending the request may further include accessing, by the computing device 100, the Internet resource referenced by the URL.

In some examples, receiving the access to the digital item may include communicating, by the computing device 100, with the kiosk computing device 110 based at least in part on the device identifier 130 and receiving, by the computing device 100 and from the kiosk computing device 110 via the second communication pathway 118, the digital item 120. In some examples, the second communication pathway 118 may include a wireless communication pathway. In some examples, the second communication pathway 118 includes a second short-range wireless communication pathway. In some examples, the second communication pathway 118 includes the Internet.

In some examples, receiving the device identifier may further include receiving, by the computing device via the first short-range wireless communication pathway 116, the device identifier 118 from a tag device 114 associated with the kiosk computing device 110. In some examples, the computing device 100 may include a near-field communication (NFC) module, the tag device 114 may include a passive NFC tag, and the first short-range wireless communication pathway may include an NFC pathway. In some examples, the digital item may include one or more of an electronic book, an audio file, and a video file.

Figure 6:
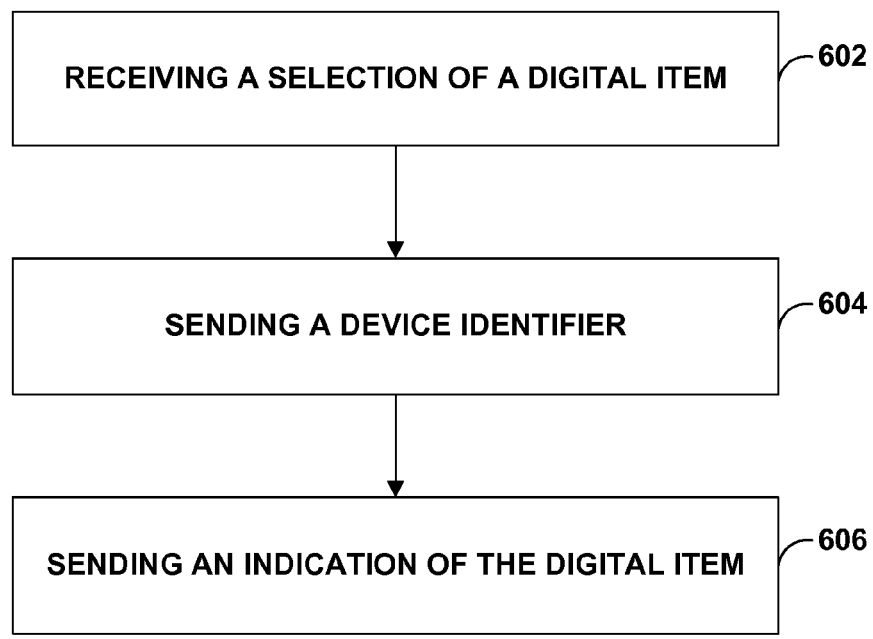
FIG. 6 is a flowchart illustrating an example process to provide access to a digital item according to some aspects of the present disclosure.

FIG. 6 is a flow chart illustrating an example process that may be performed by an example kiosk computing device, such as kiosk computing device 110 of FIG. 1, to provide access to a digital item according to aspects of the disclosure. The process may include receiving, by a kiosk computing device 110, a selection of a digital item 122 (602). The process may further include sending, from the kiosk computing device 110 to the computing device 100 via a first short-range wireless communication pathway, a device identifier 130 associated with the kiosk computing device 110 that enables the computing device 100 to access the digital item, wherein the digital identifier does not identify the digital item 122 (604). The process may further include sending, by the kiosk computing device 110 via a second communication pathway 118, an indication of the digital item 122 for access by the computing device 100 based at least in part on the device identifier 130, the second communication pathway 118 being different from the first short-range wireless communication pathway (606).

In some examples, sending the device identifier 130 may further include sending, by the kiosk computing device 110 to the computing device 100 using a tag device 114 associated with the kiosk computing device 110, the device identifier 130. In some examples, the computing device 100 includes a near-field communication (NFC) module, the tag device 114 comprises a passive NFC tag, and the first short-range wireless communication pathway comprises a NFC pathway.

In some examples, sending the indication of the digital item may include sending the indication of the digital item 122 from the kiosk computing device 110 to the computing device 100. In some examples, the indication of the digital item comprises the digital item 122. In some examples, the device identifier 130 further includes a universal resource locator (URL) that references an Internet resource provided by the remote system. In some examples, the indication of the digital item 122 may include a redirection pointer to the digital item 122.

In some examples, the digital item 122 is included in a zone out of a plurality of zones in the kiosk computing device 110. In some examples, sending the device identifier may further comprise sending, by the kiosk computing device 110 using a tag device 114 associated with the zone that includes the digital item 122, the device identifier, wherein the tag is included in a plurality of tag devices associated with the kiosk computing device 110. In some examples, the device identifier 130 identifies the kiosk computing device 110 and the zone that includes the digital item 122.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. These and other examples are within the scope of the following claims.

The invention claimed is:

1. A method comprising:
receiving, by a computing device and from a kiosk computing device via a first communication pathway comprising a first short-range wireless communication pathway, a device identifier associated with the kiosk computing device, wherein the kiosk computing device is operable to receive a selection of a digital item out of a plurality of digital items, and wherein the device identifier does not change regardless of the selected digital item and does not identify the digital item;
sending, by the computing device, a request for access to the digital item based at least in part on the device identifier associated with the kiosk computing device; and
in response to sending the request, receiving, by the computing device via a second communication pathway, access to the digital item selected at the kiosk computing device based at least in part on the device identifier, the second communication pathway being different from the first communication pathway.

2. The method of claim 1, wherein sending, by the computing device, the request for access to the digital item comprises:
sending, by the computing device to a remote system, the request for access to the digital item based at least in part on the device identifier associated with the kiosk computing device.

3. The method of claim 2, wherein receiving the access to the digital item comprises:
receiving, by the computing device, the access to the digital item at the remote system.

4. The method of claim 2, wherein receiving the access to the digital item comprises:
receiving, by the computing device, the digital item from the remote system.

5. The method of claim 2, wherein the device identifier includes a universal resource locator (URL) that references an Internet resource provided by the remote system.

6. The method of claim 5, wherein sending the request comprises:
accessing, by the computing device, the Internet resource referenced by the URL.

7. The method of claim 1, wherein receiving the access to the digital item comprises:
communicating, by the computing device, with the kiosk computing device based at least in part on the device identifier; and
receiving, by the computing device and from the kiosk computing device via the second communication pathway, the digital item.

8. The method of claim 7, wherein the second communication pathway comprises a wireless communication pathway.

9. The method of claim 8, wherein the second communication pathway comprises a second short-range wireless communication pathway.

10. The method of claim 7, wherein the second communication pathway comprises the Internet.

11. The method of claim 1, wherein receiving the device identifier further comprises:
receiving, by the computing device via the first short-range wireless communication pathway, the device identifier from a tag device associated with the kiosk computing device.

12. The method of claim 11, wherein:
the computing device includes a near-field communication (NFC) module;
the tag device comprises a passive NFC tag; and
the first short-range wireless communication pathway comprises an NFC pathway.

13. The method of claim 1, wherein the digital item includes one or more of an electronic book, an audio file, and a video file.

14. A computing device comprising:
one or more processors; and
a short-range wireless communication module configured to receive, via a first short-range wireless communication pathway and from a kiosk computing device, a device identifier associated with the kiosk computing device, wherein the kiosk computing device is operable to receive a selection of a digital item out of a plurality of digital items, and wherein the device identifier does not change regardless of the selected digital item and does not identify the digital item; and
wherein the one or more processors are configured to:
send a request for access to the digital item based at least in part on the device identifier associated with the kiosk computing device, and in response to sending the request, receive, via a second communication pathway, the access to the digital item based at least in part on the device identifier.

15. A computer-readable storage device comprising instructions that, when executed by at least one programmable processor, cause the at least one programmable processor to perform operations comprising:
receiving, by a computing device and from a kiosk computing device via a first communication pathway comprising a first short-range wireless communication pathway, a device identifier associated with the kiosk computing device, wherein the kiosk computing device is operable to receive a selection of a digital item out of a plurality of digital items, and wherein the device identifier does not change regardless of the selected digital item and does not identify the digital item;
sending, by the computing device, a request for access to the digital item based at least in part on the device identifier associated with the kiosk computing device; and
responsive to sending the request, receiving, by the computing device via a second communication pathway, the access to the digital item based at least in part on the device identifier.

16. A method comprising:
receiving, by a kiosk computing device, a selection of a digital item out of a plurality of digital items;
sending, from the kiosk computing device to a computing device via a first communication pathway comprising a first short-range wireless communication pathway, a device identifier associated with the kiosk computing device that enables the computing device to access the digital item, wherein the digital identifier does not change regardless of the selected digital item and does not identify the digital item; and
sending, by the kiosk computing device via a second communication pathway, an indication of the digital item for access by the computing device based at least in part on the device identifier, the second communication pathway being different from the first communication pathway.

17. The method of claim 16, wherein sending the device identifier further comprises:
sending, by the kiosk computing device to the computing device using a tag device associated with the kiosk computing device, the device identifier.

18. The method of claim 17, wherein:
the computing device includes a near-field communication (NFC) module;
the tag device comprises a passive NFC tag; and
the first short-range wireless communication pathway comprises a NFC pathway.

19. The method of claim 16, wherein sending the indication of the digital item comprises:
sending the indication of the digital item from the kiosk computing device to the computing device.

20. The method of claim 19, wherein the indication of the digital item comprises the digital item.

21. The method of claim 16, wherein sending the indication of the digital item comprises:
sending, by the kiosk computing device, the indication of the digital item to a remote system via the second communication pathway.

22. The method of claim 21, wherein the indication of the digital item comprises the digital item.

23. The method of claim 21, wherein the device identifier further includes a universal resource locator (URL) that references an Internet resource provided by the remote system.

24. The method of claim 16, wherein the indication of the digital item comprises a redirection pointer to the digital item.

25. The method of claim 16, wherein the digital item is included in a zone out of a plurality of zones in the kiosk computing device.

26. The method of 25, wherein sending the device identifier comprises sending, by the kiosk computing device using a tag device associated with the zone that includes the digital item, the device identifier, wherein the tag is included in a plurality of tag devices associated with the kiosk computing device.

27. The method of claim 26, wherein the device identifier identifies the kiosk computing device and the zone that includes the digital item.

* * * * *